F. W. BOURGOIN.
FARM GATE.
APPLICATION FILED DEC. 10, 1915.

1,198,318.

Patented Sept. 12, 1916.
2 SHEETS—SHEET 1.

WITNESSES

INVENTOR
Francis W. Bourgoin,
BY Richard B. Owen,
ATTORNEY

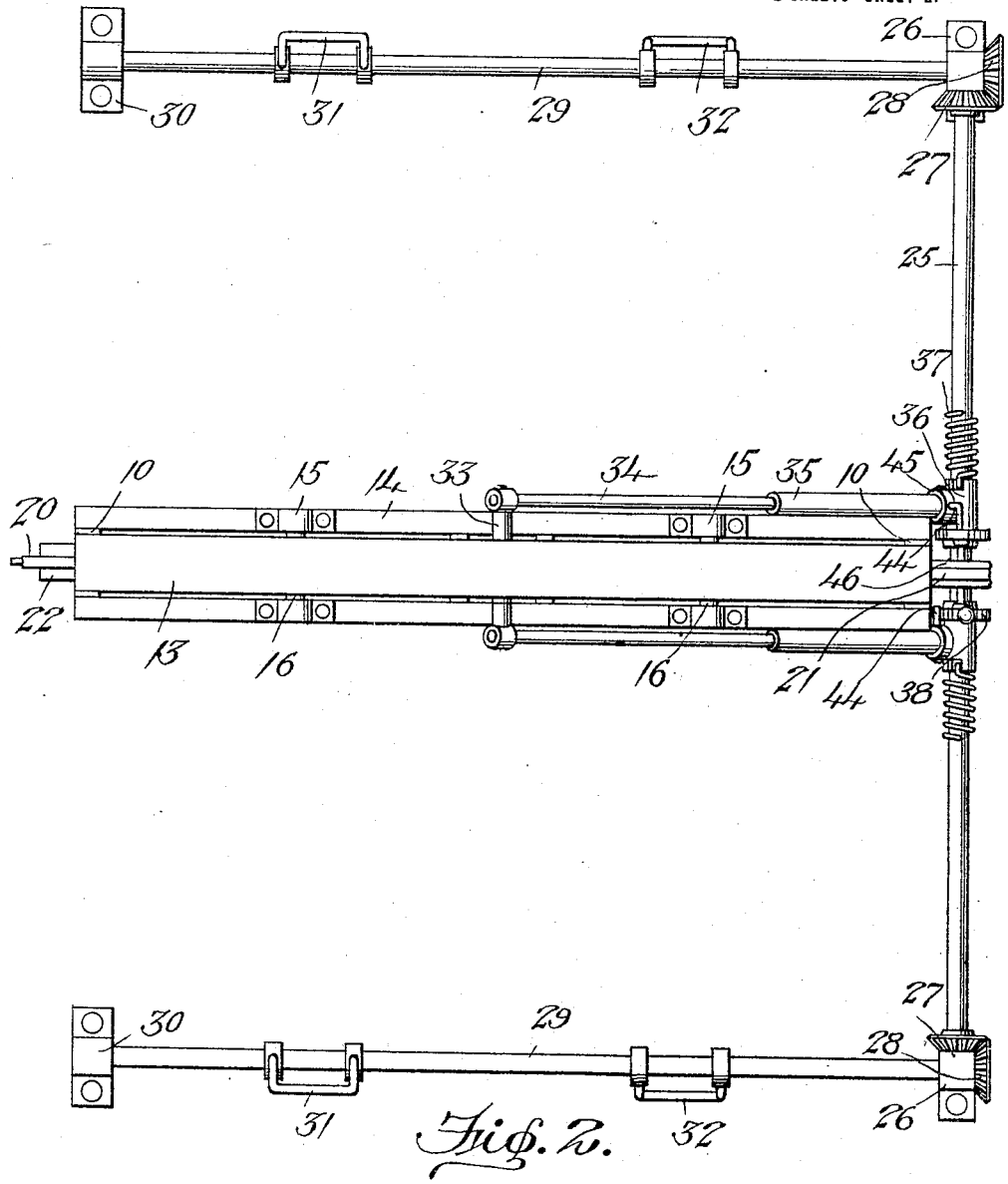

UNITED STATES PATENT OFFICE.

FRANCIS W. BOURGOIN, OF DE CAMP, MISSOURI.

FARM-GATE.

1,198,318.  Specification of Letters Patent.  Patented Sept. 12, 1916.

Application filed December 10, 1915. Serial No. 66,147.

*To all whom it may concern:*

Be it known that I, FRANCIS W. BOURGOIN, a citizen of the United States, residing at De Camp, in the county of Phelps and State of Missouri, have invented certain new and useful Improvements in Farm-Gates, of which the following is a specification.

This invention relates to an improved farm gate and the principal object of the invention is to provide improved means for opening and closing the gate, the operating means being actuated by the wheels of the vehicle approaching the gate and being so constructed that the gate will not be violently thrown open or closed.

Another object of the invention is to so construct this operating mechanism that the gate may be opened and closed by a vehicle approaching it from either direction.

Another object of the invention is to provide a gate of an improved structure having supporting wheels mounted within its length to permit the gate to travel easily.

Another object of the invention is to so construct the operating mechanism for the gate that it may be formed principally from piping.

This invention is illustrated in the accompanying drawings, wherein:—

Figure 1:
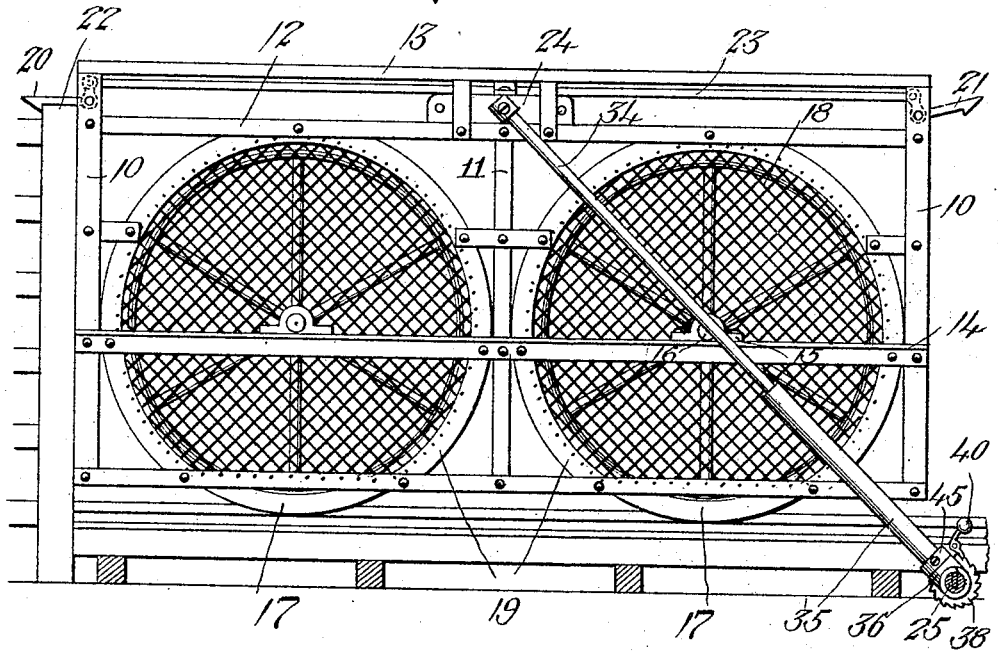
Figure 3:
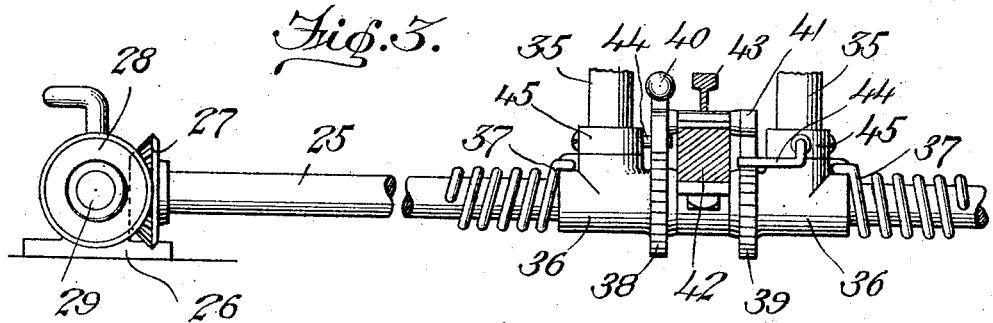
Figure 4:
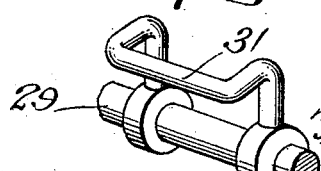

Figure 1 is a view showing a gate in side elevation, the gate being of the improved structure and provided with the improved operating mechanism. Fig. 2 is a top plan view of the improved gate and operating mechanism. Fig. 3 is a fragmentary view partially in side elevation and partially in section and showing the manner of connecting the gate engaging arms with the main shaft of the operating mechanism. Fig. 4 is a fragmentary view of one of the studs forming part of the mechanism.

The gate which is used in connection with the operating mechanism is disclosed in Figs. 1 and 2 and is provided with the vertically extending bars 10 and 11 and longitudinally extending rails 12 and 13, the rail 13 being the top rail of the fence. Side bars 14 are secured to the end bars 10 and intermediate bar 11 and carry bearings 15 in which are mounted the shafts or axles 16 for the supporting wheels 17. These wheels are inclosed by netting 18 formed of wire carried by hooks or rings 19 thus protecting the wheels and preventing movement of the wheels being interfered with by sticks or other objects becoming caught in the spokes of the wheels. The gate is to be releasably held in a closed or in an open position and therefore there has been provided the latches 60 20 and 21, the latch 20 serving to releasably hold the gate in the closed position by engagement with the bar or post 22 and the latch 21 serving to releasably hold the gate in an open position. These latches are of 65 the bell-crank type and are connected by a rod 23 which rod is connected at a point intermediate its length with the blocks 24 slidably mounted between the upper bar 13 of the gate and the upper longitudinally extending rail 12.

The operating mechanism for the gate is clearly disclosed in the drawings and is shown in top plan in Fig. 2. The main shaft or driven shaft 25 of the operating 75 mechanism is rotatably mounted in the bearings 26 and carries gears 27 meshing with the gears 28 carried by the driving shafts 29. These driving shafts 29 are also mounted in the bearings 26 and have their opposite ends 80 mounted in bearings 30. Stirrups or abutments 31 and 32 are carried by the driving shafts 29 and are positioned so that they may be engaged by the wheels of a wagon or other vehicle to rotate the shafts and transmit rotary motion to the driven shaft 25. It is of course understood that these stirrups will be so positioned that one set will be used when approaching the gate in a given direction.

As the shaft 25 rotates, the gate will be moved longitudinally by the means of mechanism which will now be described.

The block 24 carries a pin 33 which extends beyond the sides of the block and is 95 pivotally connected with the upper ends of rods 34 which telescope into the pipes 35. If desired the rods 34 may be solid or may be in the form of smaller pipes which will fit into pipes 35. These pipes 35 are connected with the couplings 36 which are rotatably mounted on driven shaft 25 and are connected with the springs 37 wound about the shaft 25 and connected with the same. Ratchet wheels 38 and 39 are rigidly mounted upon the shaft 25 adjacent the couplings and are engaged by the pawls 40 and 41. These pawls 40 and 41 are pivotally mounted by means of a pin passing through the foundation 42 for rail 43 upon which the wheels 17 travel. It should be noted that these pawls 40 and 41 extend in opposite directions so that the gate can be moved to either an open or a closed position by the action of the springs 37. Pins 44 extend from collars 45 placed about the pipes or tubes 35 and extend to engage the pawls 40 and 41 and move the same into and out of an operative position.

The gate is set up in the manner shown in Figs. 1 and 2 and it will be supposed that it is shut as shown. A vehicle approaching the gate will be driven so that one of its wheels will engage one of the stirrups and rotate the driving shaft 29 to that side of the gate. This will rotate shaft 25 and of course will wind the springs 37. The latch which is in an operative position will engage its ratchet wheel and prevent the shaft from having a tendency to turn to its normal position. Therefore the springs which are connected with the actuating arms or pipes 35 will swing these arms thus drawing the gate toward the open position. The action will first be brought against blocks 24 thus swinging the latch 20 to a releasing position. As the gate moves to an open position, the pipes or rods 34 will move into the pipes 35 and thus prevent the gate from being raised off of the track. Upon the gate reaching the open position the latch 21 will engage the post 46 thus releasably holding the gate in the open position. As the gate moves toward the open position, the pawls 40 and 41 will be reversed in their position by the action of fingers or pins 44 and will assume the position shown in Fig. 3 with the pawl 41 engaging the ratchet wheel 39 and the pawl 40 out of engagement with the ratchet wheel 38. The mechanism is then ready to close the gate. The vehicle will be driven through the gate way and the wheels will strike the stirrups upon the opposite side of the gate thus rotating the shaft 29 carrying the same and repeating the operation already described thus causing the gate to close. Of course the gate can be operated for opening or closing from either direction of approach, the stirrups being positioned at an angle to each other so that when the shaft 29 upon one side of the gate is in the position for opening the gate and is rotated by a vehicle wheel passing over the stirrups, the shaft upon the opposite side will be moved from a position to open the gate to a position to close the same.

I have therefore provided a gate and an improved operating mechanism which is so constructed that the gate can be easily opened and then closed from either approach and have further provided an operating mechanism so constructed that the gate will not be violently thrown open and closed, excessive motion being taken up by the springs. I have further provided a gate structure so constructed that it will be very strong and durable, the gate being provided with large supporting wheels mounted in the gate and protected by the wire mesh.

What is claimed is:—

1. In a device of the character described, a sliding gate, a rotary shaft, arms pivotally connected with said gate and rotatably mounted upon said shaft, a track for said gate, pawls carried by said track, ratchets carried by said arms and engaged by said pawls, springs wound upon said shaft and connected with said shaft and with said arms, and means for rotating said shaft to wind said springs and swing said arms to move said gate longitudinally upon said track.

2. A gate mechanism including a sliding gate, a rotary shaft, arms pivotally connected with said gate and rotatably connected with said shaft, springs wound about said shaft and connected with said arms, and means for rotating said shaft to energize said springs and cause the springs to swing said arms and move said gate longitudinally.

3. A gate operating mechanism comprising a sliding gate, a latch operating mechanism carried by said gate, a rotary shaft, arms pivotally connected with said latch operating mechanism and rotatably mounted upon said shaft, springs connected with said shaft and with said arms, and means for rotating said shaft to wind said springs and energize the same to swing said arms and move said gate longitudinally.

4. A gate operating mechanism including a gate, a rotary shaft, sleeves rotatably mounted upon said shaft and provided with ratchet wheels, arms extending from said sleeves and pivotally connected with said gate, springs wound upon said shaft and connected with the shaft and with the sleeves, pawls engaging said ratchet wheels, and means for rotating said shaft to wind said springs, the springs through engagement with said sleeves swinging said arms to move said gate longitudinally.

5. A gate operating mechanism comprising a sliding gate, a rotary operating shaft, means for rotating said shaft, telescoping arms rotatably mounted upon said shaft and connected with said gate, springs mounted upon said shaft and connected with the shaft and with the arms, means for holding said springs under tension when said shaft is rotated, and actuating means for said last mentioned means.

6. A gate operating mechanism including a gate, a driven shaft, arms rotatably mounted upon said shaft and pivotally connected with said gate, springs mounted upon said shaft and connected with said arms, driving shafts in operative relation to said driven shaft, and abutments carried by said driving shafts.

7. In a gate operating mechanism, a gate comprising vertical bars, longitudinally extending rails carried by said bars, a track, a latch and operating mechanism carried by said gate, supporting wheels rotatably mounted in said gate and resting upon said track, a rotary shaft, arms rotatably mounted upon said shaft and pivotally connected with the operating means for said latch, springs mounted upon said shaft and connected with the shaft and with said arms, and means for rotating said shaft.

In testimony whereof I affix my signature in presence of two witnesses.

FRANCIS W. BOURGOIN.

Witnesses:
ARTHUR W. SCHWIEDER,
HAROLD S. BOURGOIN.

Copies of this patent may be obtained for five cents each, by addressing the "Commissioner of Patents, Washington, D. C."